Aug. 14, 1934. A. P. BALL Re. 19,268

VENTILATOR CONSTRUCTION

Original Filed Jan. 8, 1932 2 Sheets-Sheet 1

INVENTOR
Albert P. Ball
BY W. Lutterman Hulbert
W. Lutterman Belknap
ATTORNEYS

Aug. 14, 1934. A. P. BALL Re. 19,268

VENTILATOR CONSTRUCTION

Original Filed Jan. 8, 1932 2 Sheets-Sheet 2

INVENTOR
Albert P. Ball

BY W. Lutterloh & Hulbert
W. Lutterloh & Belknap

ATTORNEYS

Reissued Aug. 14, 1934 Re. 19,268

UNITED STATES PATENT OFFICE 19,268

VENTILATOR CONSTRUCTION

Albert P. Ball, Detroit, Mich., assignor to Briggs Manufacturing Company, Detroit, Mich., a corporation of Michigan Original No. 1,883,464, dated October 18, 1932, Serial No. 585,606, January 8, 1932. Application for reissue January 6, 1933, Serial No. 650,559

10 Claims. (Cl. 98—2)

This invention relates to a ventilator construction for use in motor vehicles and the like, and more particularly to a ventilator arranged in the hood of an automobile body.

In conventional practice, where the so-called cowl ventilators are used in motor vehicles, it has been the custom to provide a fixed exterior cowl section extending forwardly from the windshield, such cowl section having an opening formed therein for ventilating purposes and adapted to be closed by means of a movable ventilator closure or cover carried by the cowl section. In such constructions it has heretofore been necessary, in order to obviate interference with the ventilator structure when the hood sections are raised and lowered, to shorten the hinged hood sections so that they will only extend forwardly from a point in advance of the cowl and cowl ventilator.

An object of the present invention is to provide an improved vehicle body and ventilator construction wherein the hood sections may be extended rearwardly to any desired point in advance of the windshield and wherein the ventilator may be mounted within the confines of the hood, as a result of which the ventilator closure may be operated independently of the hood and the hood raised and lowered independently of the ventilator.

It is therefore one of the important objects of this invention to provide a ventilator structure which is mounted on a fixed portion of the vehicle, which permits ventilation through the top of the hood, and which is separate from the hood sections so that the hood sections may each be operated without interference from the ventilator. The invention also contemplates an arrangement wherein the ventilator closure is in registration with the opening in the hood when the latter is closed, the ventilator being controlled by a closure which, in its closed position, is located in the plane of the hood opening and, to all appearances, forms a continuation of the hood.

The several objects, advantages and novel features of construction of the invention will be made more apparent as this description proceeds, especially when considered in connection with the accompanying drawings, wherein Figure 1 is a fragmentary perspective view of a portion of a motor vehicle, having a ventilator constructed in accordance with my invention;

Figure 1:
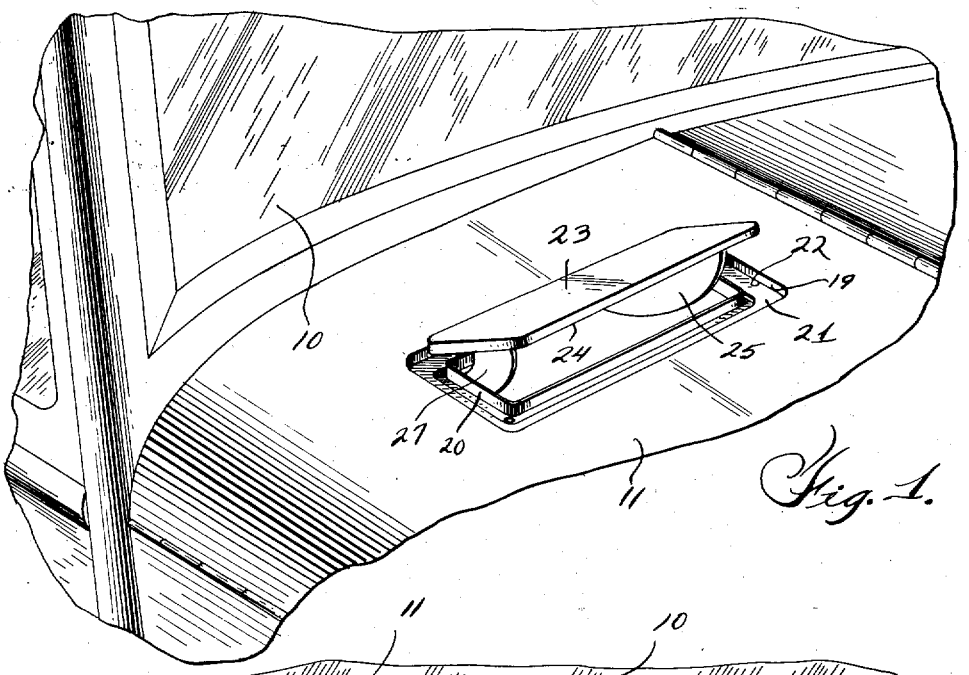
Figure 2:
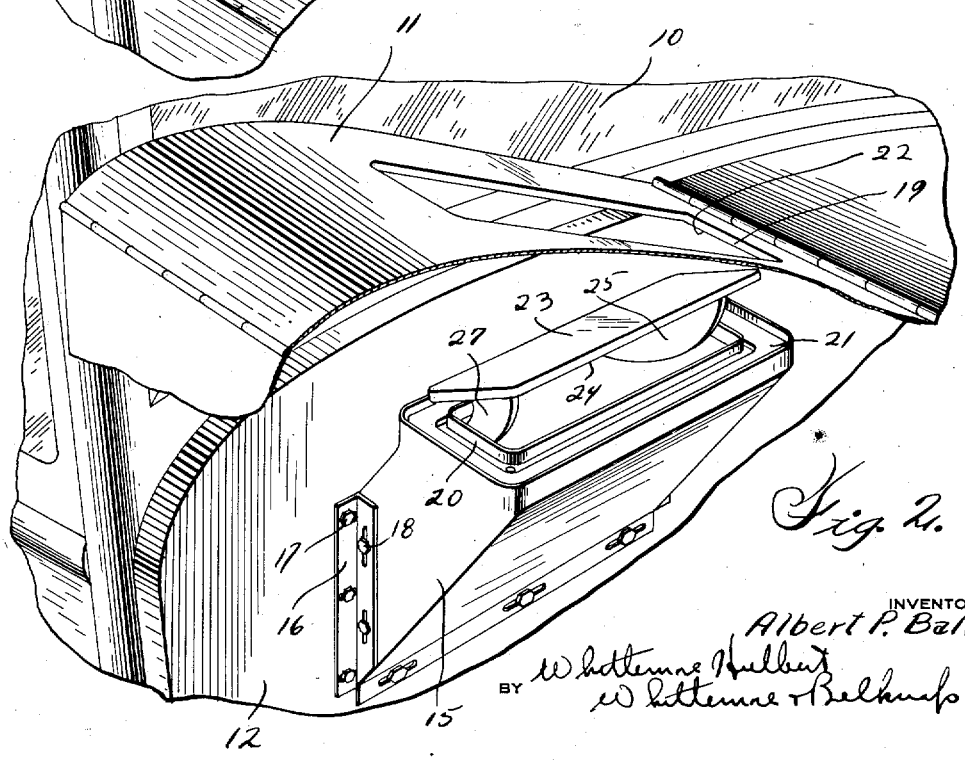
Figure 2 is a similar view with the hood section partially raised.
Figure 3:
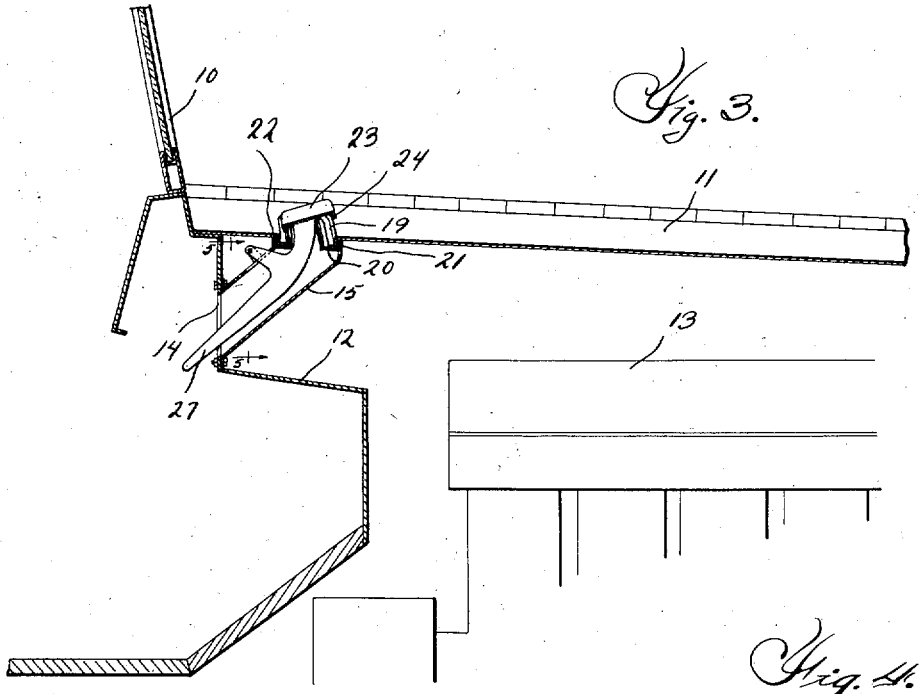
Figure 3 is a fragmentary longitudinal sectional elevational view of a motor vehicle showing the ventilator structure.

Referring now more particularly to the drawings wherein like reference characters indicate like parts, it will be noted that there is illustrated fragmentarily, the windshield 10, hood 11, dash 12, and motor 13 of a motor vehicle. In the present embodiment of the invention, herein shown by way of example, the pivoted sections of the hood 11 are extended rearwardly substantially to the windshield, and hence in such case the usual exposed cowl section is eliminated. A ventilator is provided and disposed with a ventilating opening located within the area or confines of the hood at the top thereof, this ventilator including a movable closure and operating mechanism therefor carried by or supported from the dash beneath the hood. In the present instance the dash 12 is provided with an opening 14 and preferably secured to the dash, in registration with this opening 14, is a ventilator conduit 15. While any preferred or desired means may be provided for attaching the conduit to the dash, I have provided angle members 16, one flange of each of which is secured by bolt and slot connections 17 to the dash, whereas the other flange of each is secured by bolt and slot connections 18 with the conduit. The slots extend in opposite directions so that a substantial uninversal adjustment of the conduit with respect to the dash, is possible.

The conduit 15 extends upwardly into registration with an opening 19 in the hood section 11, and it is for the purpose of providing for an alignment of the upper end of the conduit with the opening 19 that the universal mounting aforesaid of the conduit, is provided.

Figure 4:
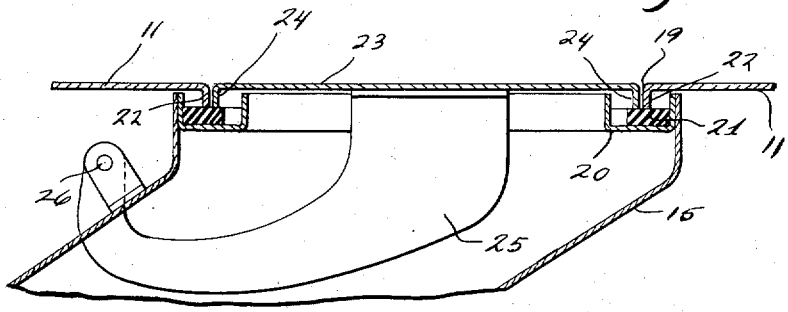
Figure 4 is an enlarged sectional view through the closure end of the ventilator.
Figure 5:
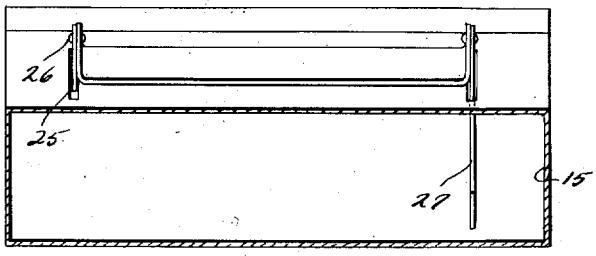
Figure 5 is an enlarged sectional view taken substantially on a plane indicated by line 5—5 in Figure 3.

As seen most clearly in Figure 4, the upper end of the conduit 15 is provided with a U-shaped channel member 20 around the periphery thereof, in which a resilient pad or the like 21, is located. The opening 19 in the hood section 11 is provided peripherally thereof with a downwardly extending flange 22 which enters the U-shaped channel 20 in the closed position of the hood section and engages the pad 21 to provide a substantially weatherproof joint.

The ventilating opening through the hood is adapted to be closed by a closure member 23. In the present instance this closure is provided with a peripherally down turned flange 24 which, in the closed position of the closure, engages the pad 21 to provide a weatherproof seal for the closure.

The closure 23 may be, and preferably is, hingedly supported by the customary hinge members 25, pivotally mounted at 26 and the closure is operated by means of an operating lever 27.

It will be seen that when the hood section 11 is closed and when the closure 23 is in its shut position, this latter closure lies in the same general plane as the opening 19 in the hood section and to all appearances forms a continuation of the hood section.

However, the closure 23 may be opened to permit air to flow through the conduit 15 and through the opening 14 of the dash and thus into the interior of the vehicle. Moreover, the hood section 11 may be opened without interference from the ventilator as the latter is mounted entirely independently thereof.

Obvious modifications may suggest themselves to those skilled in this art and to this end reservation is made to make such changes as may come within the purview of the accompanying claims.

I claim:

1. In a vehicle body in which the hood extends rearwardly to a point adjacent the windshield, the combination of a movable hood section having an opening therein, a dash, and a ventilator conduit secured to said dash and extending under said hood section and into registration with said opening when the hood section is closed.

2. In a vehicle body in which the hood extends rearwardly to a point adjacent the windshield, the combination of a movable hood section having an opening therein, a dash, a ventilator conduit secured to said dash and extending under said hood section into registration with said opening when the hood section is closed, and means for adjustably securing said conduit to said dash.

3. In a vehicle body in which the hood extends rearwardly to a point adjacent the windshield, the combination of a movable hood section having an opening therein, a dash, a ventilator conduit secured to said dash and extending under said hood section into registration with said opening when the hood section is closed, and a closure for said conduit located in the plane of the hood opening when the hood is in closed position.

4. In a vehicle body, a dash having a ventilator conduit connected thereto, a hood member having an opening therein registering with the upper end of said conduit, and a closure for said conduit located in the plane of the hood opening when the hood is in closed position.

5. In a vehicle body, a hood member provided with an opening therein, a dash provided with an opening therethrough, a conduit secured to said dash and extending from the opening therein to the hood opening, and a closure for said conduit located in the opening of the hood when the latter is in closed position.

6. In a ventilator structure for automobiles, a pivoted hood section having a ventilating opening, a fixed body frame portion beneath the hood, a ventilator closure carried by said frame portion independently of the hood section for closing said opening, said closure being disposed within the confines of the hood section when closed and the latter adapted to be raised and lowered without interfering with the closure.

7. In a ventilator for an automobile body having a dash and a pivoted hood section provided with a ventilating opening at its top, a movable closure supported from said dash and adapted to lie within said opening when the hood section is lowered, said hood section adapted to be raised and lowered independently of the closure.

8. In a ventilator for an automobile body having a dash and a pivoted hood section provided with a ventilating opening at its top, a movable closure supported from said dash and adapted to lie within said opening when the hood section is lowered, said hood section adapted to be raised and lowered independently of the closure, and means for independently moving said closure in any position of the hood section.

9. In a vehicle body, an engine hood provided with a movable pivoted section having an opening at its top, a cover for closing said opening, means for supporting said cover independently of the pivoted hood section, said cover being adjustable within and through said opening when the hood is closed and being mounted so that the hood may be raised and lowered without moving the cover.

10. In a vehicle body, an engine hood provided with a movable pivoted section having an opening at its top, a closure for said opening supported independently of the pivoted hood section whereby the latter may be raised and lowered without moving said closure, and a device for adjusting said closure and adapted to be projected through said opening when the hood section is closed.

ALBERT P. BALL.